T. H. MÜLLER & H. C. BENSON.
MACHINE FOR CUTTING AND SMOOTHING ENDS OF WOODEN PENCILS.
No. 108,721.     Patented Oct. 25, 1870.
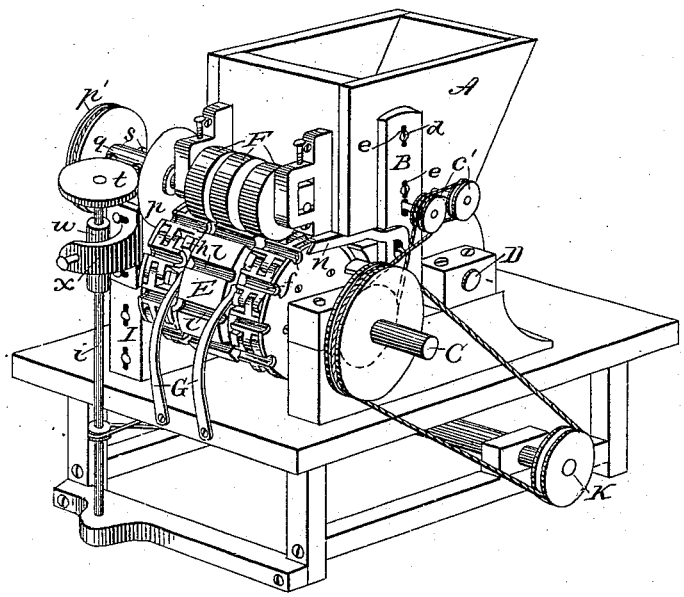
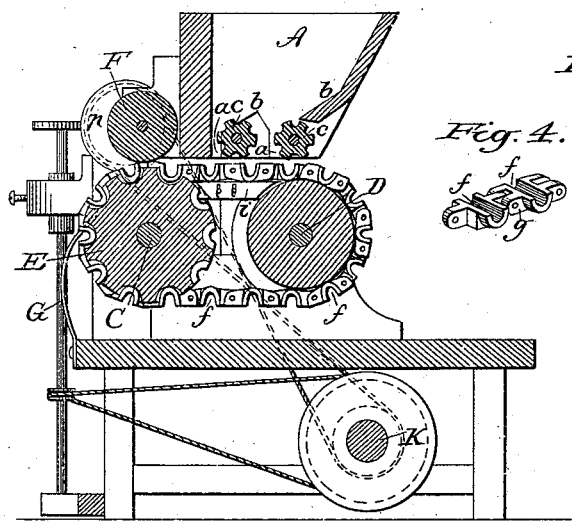
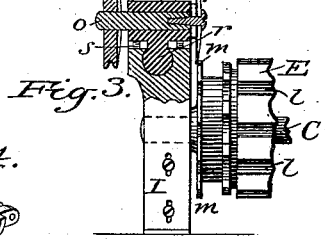
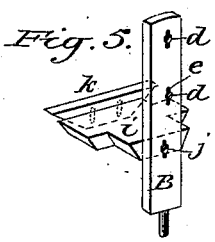

United States Patent Office.

TEILE H. MÜLLER AND HENRY C. BENSON, OF NEW YORK, N. Y., ASSIGNORS TO JOSEPH RECKENDORFER, OF NEW YORK CITY.

Letters Patent No. 108,721, dated October 25, 1870.

IMPROVEMENT IN MACHINES FOR CUTTING AND SMOOTHING THE ENDS OF PENCILS.

The Schedule referred to in these Letters Patent and making part of the same

*To all whom it may concern:*

Be it known that we, TEILE H. MÜLLER and HENRY C. BENSON, both of the city, county, and State of New York, have invented certain new and useful Improvements in Machinery for Cutting and Smoothing the Ends of Wooden Pencils, of which the following is a specification.

Our invention relates to machinery for cutting and smoothing the ends of wooden pencils, which embraces a feed-hopper for the pencils, feeding devices for carrying the pencils to the knife, and a knife or blade for cutting and smoothing the ends of the pencils, which, by the operation of the feed devices, are presented regularly and in succession to the knife.

The principal objects we have in view, are—

First, to prevent the pencils from crowding into the throat of the hopper to such an extent as to interfere with the free delivery of the pencils to the feeding devices;

Secondly, to render the machine capable of feeding to the cutter pencils of varying size or diameter without danger of clogging the movement of the feed devices; and Thirdly, to produce a drawing cut upon the end of the pencil with a plane-surfaced circular knife or blade.

Our invention consists in the means hereinafter described for accomplishing the above-named objects; and It further consists in means for holding the pencils while they are operated on by the cutter; in stripping devices for removing the pencils from the feed devices after they have been cut; and in the particular construction of the feed-chains and grooved carrying-cylinder.

To enable others skilled in the art to understand and use our invention, we will describe fully the manner in which the same is or may be carried into effect, by reference to the accompanying drawing, in which—

Figure 1 is a perspective view of a machine made in accordance with our invention.

Figure 2 is a longitudinal vertical central section of the same.

Figure 3 is a section through the cutter-knife, and the ball or compass-joint, upon which it is mounted.

Figure 4 is a perspective view of two of the links, detached from the feed-chain.

Figure 5 is a perspective view of the platform gauge for supporting the chain, and the inner gauge for preventing the pencils from dropping more than a certain depth into the troughs in the feed-chains and cylinder.

The hopper A, in which the pencils are placed, is of any suitable form, and is supported above the feeding devices in any proper manner. It should be at such distance above the feed-chain that no more than one pencil can drop from it into the trough in the chain, which may happen to be under the opening in the hopper.

There may be one or more feed-openings in the hopper; two are shown in the drawing.

Each one, *a*, is formed transversely to the length of the hopper, by parallel partition-boards, which leave a transverse opening, the width of which is about equal to the diameter of the pencil.

The pencils, when put into the hopper, pass down the inclines *b b*, and fill the openings, and are very apt to choke up the throat of the said openings, unless means be provided for removing from such locality the pencils in excess of those required to fill the openings. We, therefore, arrange at the top of the openings rollers *c*, with elastic surfaces, which may be indented or corrugated, so as to take a better hold on the pencils, or may be formed of bristles or other suitable substances.

These rollers are mounted on shafts, extending transversely through the hopper, and provided with pulleys *c'*, driven by belting, which extends from the driving-shaft, as shown in fig. 1.

When the machine is in motion, these rollers revolve in the direction indicated by the arrows, so as to throw back from the throat all excess of pencils, and thus allow free delivery of the pencils to the feed-apron.

As the distance of the hopper from the feed-chains is governed, in a measure, by the dimensions of the pencils, which are to be operated on, we secure the hopper in place by means of screws *d*, which pass through slots *e*, formed in standards B, whereby the adjustment of the hopper, at a greater or lesser distance from the feed-chain may be easily effected.

The pencils fall from the hopper upon a feed-apron, and into troughs formed in said apron.

The apron, in this case, is formed of two chains, composed of links, each of which has a transverse trough, *f*, on top, and a recess, *g*, on the side, for the teeth of the driving-wheel to engage in or with; and the links are united, so as to form a chain by transverse pins passing through the ears of the links, which are fitted together in the manner plainly shown in fig. 4; or the links may, if desired, be mounted upon a flexible strap, or otherwise held together, so as to form an endless chain.

The two chains, which, in this instance, form the feed-apron, are stretched under the hopper, as shown plainly in figs. 1 and 2, and are held upon the front rollers, which we call the carrying-rollers or cylinder, and the rear or tightening-rollers.

The forward rollers are the driving-rollers, and are provided with spurs or teeth $h$, which take into or engage with the recesses $g$ of the links.

The rollers are mounted on a shaft, C, which receives motion from the main driving-shaft K, and the chain-tightening roller or rollers are mounted upon a shaft, D.

The shaft D, if desired, may be made the driving-shaft, in which case its rollers must, of course, be provided with teeth $h$, to engage with the links.

It will be noticed that that part of the chain between the troughs $f$ is plane-surfaced when under the hopper, as shown in fig. 2, and is in such proximity to the openings $a$ that no pencil can drop therefrom until an empty trough is brought directly under the opening.

In order to uphold the chain, and prevent it from slacking when under the hopper, we employ a platform-gauge or support, $i$, which is placed underneath the chain, so as to support it, as shown in fig. 2, and can be raised or lowered, and adjusted at any desired height, by means of a set-screw $j$, which fits in a slot in the standard B, as shown in fig. 5.

To this support or gauge is attached an inner gauge, $k$, which extends above the part $i$, and up along side of the inner side of the chain, the object of this gauge being to prevent the pencils from entering the trough $f$ to too great a depth.

If, for instance, the size of the pencil were such that it would not fill the trough, and thus allow another pencil to partly enter the trough, the latter pencil would be carried forward with the other, and would be broken, or would clog the movement of the machine. To obviate this danger the gauge $k$ is provided. It is placed immediately by the side of the chain, at the point where the troughs come under the hopper, and can be adjusted up or down as desired, so that, if the pencil be too small for the trough, the gauge can be raised so that the pencil will fall upon it instead of falling to the bottom of the trough, and will thus be upheld until the trough moves away from under the opening in the hopper.

It will be understood that the platform-gauge $i$ and inner gauge $k$ should be on both sides of the machine, and also that the latter gauge may be attached to any other suitable part of the machine than the part $i$.

We find it desirable to support the pencil throughout its whole length when subjected to the action of the knife or cutter, and therefore we arrange between the two forward carrying-rollers a cylinder, E, which is grooved continuously with the links of the chain, as shown at $l$, fig. 1.

There is thus a continuous trough for the reception of the pencil, and into this trough it is pressed and firmly held during the cutting operation by means of one or more elastic rolls, F, mounted upon a suitable shaft, which turns in boxes or bearings, having a screw-adjustment, so that the rolls may be pressed down upon the pencils with more or less force. We prefer to employ two or more rolls, mounted upon the same shaft, as shown in fig. 1, and arranged with spaces between them, so as to allow for the lateral expansion of the rubber or elastic material, which takes place when the rolls are pressed down upon the pencils.

The cylinder E and the carrying-rollers may be formed in one piece, if desired, and the cogs or teeth $h$ may be located either on the cylinder or rollers.

The face $m$ of the cylinder or roller contiguous to the circular cutting-blade is made of steel, so that, as the cutter revolves in contact with it, the two may operate together to produce a scissors or double draw cut upon the end of the pencil.

The position of the pencil in the trough is such (it being brought to that position by means of side guides $n$) that its end will extend from the trough beyond the face $m$ a minute distance, just sufficient to allow the cutter to take off a very thin shaving. After the shaving is removed, the pencil moves out from under the rolls F, and is then thrown out of its trough by means of one or more stripper-blades, G, arranged as shown in fig. 1, and drops into the receiving-box.

We come now to a description of the cutting apparatus proper. As above stated, we desire to use a flat or plane-surfaced circular knife or blade, which is represented at $p$ in the drawing.

If such blade, however, were arranged parallel with the face $m$, against which it is to work, it would not produce a clean cut, and, moreover, would smear the end of the pencil with the lead. We have found it necessary, therefore, in order to produce the best results, to set the knife at an angle, both vertically and horizontally to the face $m$, or, in other words, to a plane passing at right angles through the axis of the pencils, so that no part of the blade, save the edge which makes the cut, will be in contact with the pencil end, as shown in fig. 3.

In order to obtain this adjustment of the knife, we mount the spindle or axis $o$, upon which it is made fast, in a sleeve or bracket, $q$, which is supported by a ball-and-socket joint, $r$, and adjusted by means of four screws, $s$, arranged at the corners of the bracket, and bearing against the top of the standard I, in which the socket is formed. By turning these screws the bracket may be tilted more or less in any direction, so as to allow the knife to be set at the desired angle.

The knife is revolved in the direction indicated by the arrow in fig. 1, by means of a pulley, $p'$, driven by belting from a pulley on shaft K, from which shaft motion is communicated to all parts of the machine, as before stated.

The standard I, which supports the cutting apparatus, is adjustable up and down, being held to the main frame of the machine by means of screws, which set in slots formed in the standard, as shown in fig. 3.

In connection with the circular blade we use a horizontal grinding-wheel, $t$, arranged just in rear of the cutter, as shown in fig. 1, so as to clear the edge of the knife of any lead which may adhere to it, and to keep it in good condition for use.

The wheel is mounted upon a vertical shaft, $v$, the lower end of which is stepped in a bearing formed in the lower part of the frame of the machine.

The upper end of the shaft passes through and is supported by a sleeve, $w$, which is held in a bracket, $x$. This bracket is attached to the standard I by means of screws which pass through transverse slots in the bracket, and the latter is thus capable of being moved so as to allow the grinding-wheel to be adjusted most accurately with respect to the cutter.

The shaft $v$ is rotated by belting from shaft K, so as to cause the wheel $t$ to rotate in the direction indicated by the arrow in fig. 1.

Having now described our invention, and the manner in which the same is or may be carried into effect,

What we claim, and desire to secure by Letters Patent, is—

1. The combination, in the pencil feed-hopper, of parallel partition-boards, and rollers with an elastic surface, whether indented or not, and composed of rubber, bristles, or other like substance, the rollers being arranged in relation to the partitions, and operating in connection therewith, substantially as described, so as to remove excess of pencils from the throat of the hopper or channel, and allow free delivery of the pencils to the feed-apron and cylinder.

2. The endless feed-chain, composed of links united substantially as described, each of said links being provided with a transverse trough on top, and a recess on the side for the teeth of the driving-wheel to engage in or with, as and for the purposes set forth.

3. The combination of the two endless feed-chains, the chain-tightening roller, and the roller or cylinder, grooved continuously with the trough in the chains, and provided with gear, or toothed heads for carrying the chain, substantially as shown and described.

4. The construction of the grooved pencil-carrying cylinder with a correspondingly grooved steel face, so that the same, in connection with the cutter, may produce a scissors or double draw cut, substantially as herein shown and set forth.

5. The combination, with the feed-chain, of the supporting platform-gauge, arranged between the carrying-roller and tightening-roller, whereby the chain is prevented from slacking between the rollers, thus insuring the regular delivery of the pencils on the feed-apron.

6. The combination, with the feed-chain, of the inner gauge, placed at the point where the pencils drop from the hopper into the trough in the chain, for determining the depth to which the pencils shall enter the trough, substantially as shown and set forth.

7. The combination of the feed-chain and its rollers with the hopper, made adjustable in relation to the said feed-chain, substantially as and for the purpose set forth.

8. In combination with the feed-chain and carrying-roller, one or more elastic rollers arranged immediately over the carrying-roller, whereby the pencils are firmly held in the grooves of the cylinder or carrying-roller and the troughs of the chain-links during the cutting operation, as set forth.

9. When two or more elastic rollers are combined with the carrying-cylinder and feed-chain, as set forth, the arrangement of said rollers with intermediate spaces, substantially as shown and described, so as to allow for the lateral expansion of the rubber when subjected to pressure.

10. The circular, flat, or plane-surfaced knife or blade, set at an angle, both vertically and horizontally, in reference to the plane which passes at right angles through the axes of the pencils to be operated on by said knife, substantially as and for the purposes set forth.

11. The combination of the adjustable knife and its axis or shaft with the bracket for supporting the same, adjustable by means of a ball-and-socket or universal joint, substantially as and for the purposes set forth.

12. The combination, with the circular plane-surfaced blade or knife, of the grinding-wheel, supported upon a shaft whose upper bearing is laterally adjustable upon the vertically-adjustable frame or standard which holds the cutting apparatus, as set forth.

In testimony whereof, we have signed our names to this specification before two subscribing witnesses.

TEILE H. MÜLLER.
HENRY C. BENSON.

Witnesses:
J. F. WILLIAMS,
WM. B. KRUG.